CYRIL MARSH
INVENTOR.

BY Edmund W.E.Kamm

ATTORNEY.

Patented May 8, 1945

2,375,428

UNITED STATES PATENT OFFICE 2,375,428

FUEL DISPENSING SYSTEM

Cyril Marsh, Fort Wayne, Ind., assignor to S. F. Bowser & Company, Incorporated, Fort Wayne, Ind., a corporation of Indiana Application July 18, 1942, Serial No. 451,456

10 Claims. (Cl. 210—54)

This invention relates to an apparatus for removing water from gasoline in a gasoline dispensing system. More specifically, it relates to a gasoline dispensing system for fueling aircraft in which water is separated from the fuel and is returned to the main tank from which it is pumped when it reaches a predetermined level.

Heretofore, it has been the practice in aircraft fueling systems to pass the fuel and any entrained water through a water separator of one kind or another. The water was segregated from the gasoline therein and accumulated in the water space provided. The difficulty with this apparatus was that the water space was limited and usually a manually or float operated drain was provided, and accordingly, if it was forgotten to drain the unit periodically, or if the float parts corroded or stuck, the water would be carried over with the fuel to the vehicle tanks.

To provide automatic drain apparatus for each cylinder was expensive and cumbersome, so that the manual operation was usually resorted to.

In accordance with the foregoing, one of the objects of the invention is to provide means for returning the separated water to the main storage tank and to control the water level therein.

Another object of the invention is to continuously bleed liquid from the water chambers of the separators and return the liquid to the storage tank.

Yet another object of the invention is the provision of a system comprising a main pump and a scavenging pump with liquid level controlled means for controlling both pumps.

Still another object of the invention is to provide a water level responsive control means for stopping the main pump and starting the scavenging pump where a high water level exists.

A further object of the invention is to provide a floating suction for the main pump, so that the liquid will be drawn from the upper portion of the body of liquid, in combination with a low level control which will render the main pump inoperative before the floating suction will reach the maximum water level in the tank.

Yet another object of the invention is to provide a storage tank having a main pump adapted to draw liquid from the upper portion of liquid in the tank and a scavenging pump to draw liquid from the bottom of the tank, together with a water level responsive control for stopping the main pump and starting the scavenging pump when a maximum water level prevails.

These and other objects will become apparent from a study of this specification, and the drawings which are attached thereto and made a part thereof and in which:

Figure 4 is an alternative form of drainage control element.

Figure 1:
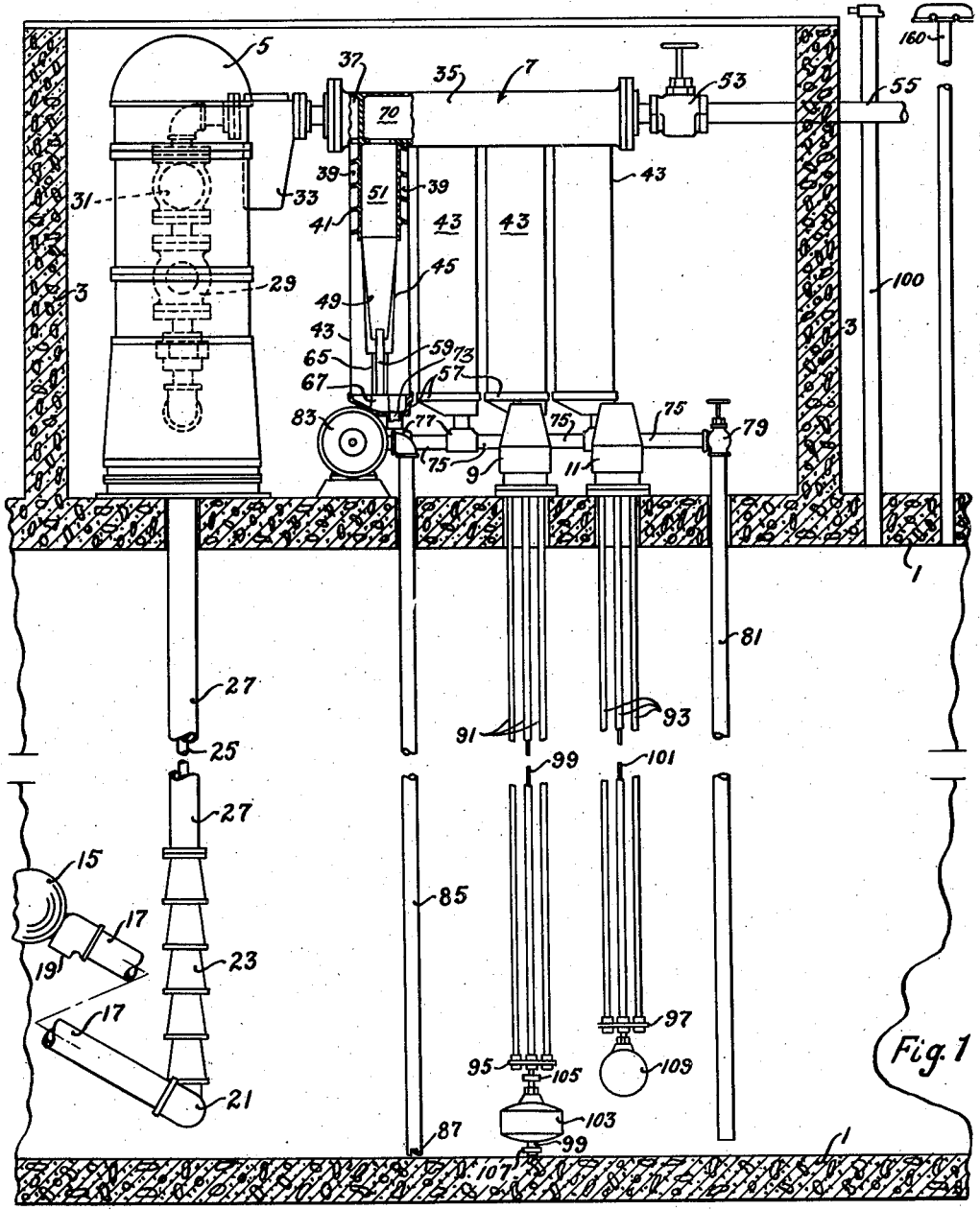
Figure 1 is an elevation showing the dispensing system and its component parts.
Figure 2:
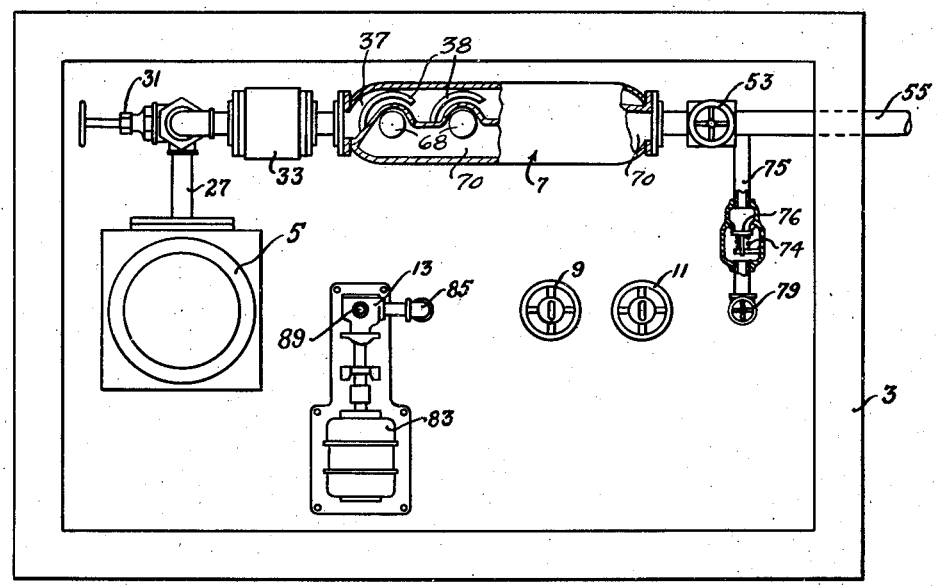
Figure 2 is a plan view of the pit shown in Figure 1.

Referring now to Figure 1, the numeral 1 indicates a storage tank for gasoline which may be of any suitable construction. As shown, it is a concrete tank. A concrete pit 3 is disposed adjacent the tank and serves to house a pump motor 5 and a water separator 7 as well as the switch housings 9 and 11 and a scavenging pump 13.

A float 15 is fixed to the outer end of suction pipe 17 immediately above the inlet opening 19 thereof. The pipe 17 is connected at the other end by a swing joint 21 to the intake end of a multiple stage, submerged type pump 23 which is driven by a shaft 25 connected at the upper end to the motor. This shaft is mounted inside the discharge pipe 27 which conducts liquid from the pump to a check valve 29 and a shut-off valve 31. The shaft leaves the pipe at the upper end through a stuffing box which is not shown.

Liquid passes from valve 31 through a strainer 33 and into the manifold 35 of the separator. The liquid passes from the inlet chamber 37 of the separator downwardly through the helical passage 39 formed by the helix 41 which depends in the cylinder 43 whence it passes inwardly through the inverted frustoconical screens 45 and 49 and up through the passage 51 into the discharge chamber of the manifold. From this chamber it passes out through shut-off valve 53 and discharge pipe 55 to the fueling pits or other dispensing equipment which may be installed in the service area. A form of fuel dispensing apparatus commonly used is disclosed in the patent to Griffith et al. No. 1,868,497 issued July 26, 1932.

A bottom head 57 closes the lower end of the cylinder and receives an aligner rod 59 which enters closely fitting perforations in the lower ends of the screens.

A tube 65 is slipped over the rod 59 and rests upon a boss 67 to support the lower screen 45. The upper ends of the screens are fixed into a collar (not shown) which rests snugly in a counterbore in passage 51 so as to seal the screen in place.

A drain opening 73 is formed in the lower head and the drain openings in all of the cylinders are manifolded together by means of pipes 75 and fittings 77 which connect through a back pressure valve and relief valve 76 with a throttle valve 79 and a discharge line 81 which passes into the tank and terminates with its open end adjacent the bottom thereof. This line 81 is relatively small and may be a standard ⅜" pipe. The force exerted on valve 76 by spring 74 is much less than the working pressure in the system but it must be sufficient to hold the valve closed when the pump 5 is shut down.

The scavenging pump 13 is provided with a motor 83 and with a suction line 85 which is disposed with its intake opening closely adjacent the bottom of the tank. Inlet notches 87 may be cut in the end of the pipe to prevent it from becoming clogged. The discharge line 89 may be connected to a sewer or any other disposal point.

Switch housing 9 is mounted in the pit and has suspended from it three rods 91 which carry at their lower ends a guide plate 95. A float rod 99 passes through a guide opening in the guide plate and carries fixed to it the upper and lower stops 105 and 107. A float 103 rides freely upon the rod between the stops and is constructed so as to float in water but to sink in gasoline.

The switch housing 11 supports three depending rods 93 which carry a guide plate 97 at their lower ends. A float rod 101 passes through the guide opening plate 97 and has fixed to it at its lower end a float 109 which is adapted to float in gasoline.

Figure 3:
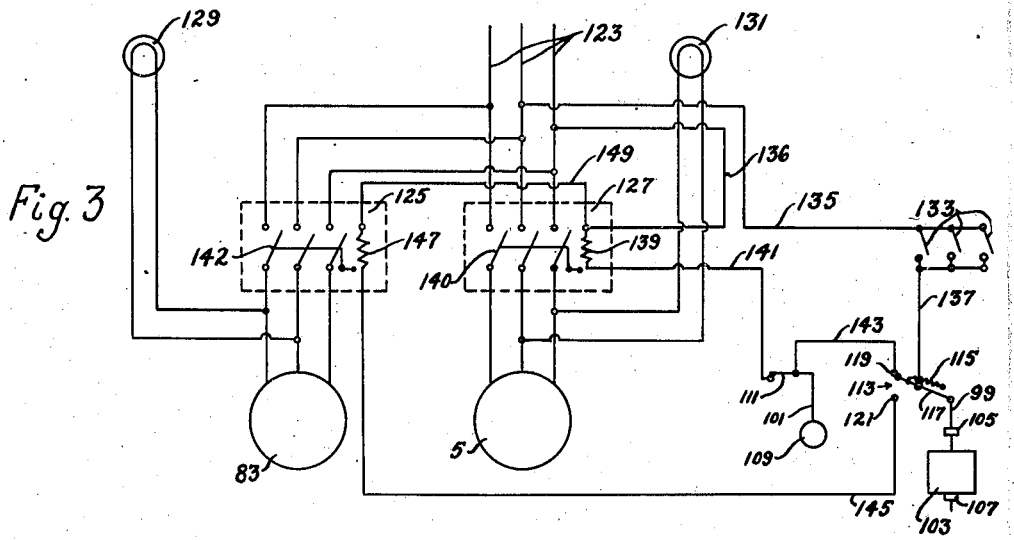
Figure 3 is a schematic wiring diagram.

A switch 111 (Figure 3) which is a single pole, single throw type, is mounted in the vapor proof housing 11 and is connected to the float 109 by rod 101. The switch is closed when the float is up. A single pole, double throw switch 113 is mounted in the vapor proof fitting 9 as shown in Figure 1. This switch is provided with an overcenter spring 115 or other holding device so that it will be held in one or the other of its closed positions. In the lower position of the float 103, the switch lever 117 contacts one pole 119 and in the upper position of the float it contacts the other pole 121.

The main power line is indicated by numeral 123 and it is connected to each of two motor starters 125 and 127. Starter 125 controls the scavenging pump motor 83 while starter 127 controls the main pump motor 5. A red signal lamp 129 is connected to the circuit of motor 83 and a green lamp 131 is connected to that of motor 5.

Numeral 133 indicates a plurality of control switches which are located at the dispensing stations and which are connected in parallel between the lines 135 and 137. Line 135 runs to one wire of the main while a lead 136 runs from the main directly to the control element 139 of starter 127, which element is in turn connected by line 141 to the switch 111. The latter is connected by lead 143 to contact 119 of switch 113. The line 137 is connected to the switch lever 117 and the switches 133. A line 145 leads from contact 121 to the control element 147 of the scavenging pump starter which in turn is connected by line 149 to line 136 and thence to the main.

*Operation*

In order to describe the operation it is assumed that the tank is full of fuel and that there is no water in the tank. In such a case float 109 will be entirely up and switch 111 will be closed while float 103 will be down as will rod 105 and the switch lever 117 will occupy extreme clockwise position in which it will engage contact 119.

When fuel is required, one of the switches 133 will be closed and a circuit will be established from one side of the main 123, through line 135, switch 133, line 137, switch lever 117, contact 119, line 143, switch 111, line 141, control element 139 and line 136 back to the main.

The element 139, when it is thus energized, closes the main switch 140 for motor 5 and the green light is lighted. The motor 5 and pump 23 are thus energized and liquid will be drawn from the upper strata of the body of liquid in tank through the floating suction inlet 19 of pipe 17, and will pass through the swing joint 21, pump 23, pump discharge pipe 27, check valve 29, shut-off valve 31, strainer 33, and the inlet chamber 37 of manifold 35. Here the liquid is divided and a part passes through the port 38 into the helical passage 39 in each of the separation chambers at a high velocity. The centrifugal action thus created tends to throw any water or heavier particles to the outside of the passage while the gasoline occupies the inner portion of the passage and passes downwardly and thence upwardly through the screens 45 and 49 into the passage 51. This reversal of flow and the centrifugal action both tend to remove water and any heavy material from the gasoline and these settle to the bottoms of the cylinders 43. It should be noted that the screens 45 and 49 are so finely woven that they will permit the passage of gasoline but will prevent the passage of droplets of water, so that any moisture which has been formed into droplets by the centrifugal action will be screened out if they attempt to pass through the screens.

The gasoline now passes up through the port 68 and into the discharge chamber 70 of the manifold 35 and out through valve 53 and pipe 55 to the discharge nozzle at the service point. In the system here disclosed, the separated water and heavier material does not collect in the cylinders 43, so that manual draining will be required, but instead, it passes out through the openings 73 in the lower heads 57 and through fittings 77 and line 75 and through the back pressure valve 76 to valve 79. This valve is "cracked" to allow a very small stream to pass into pipe 81. This drainage constitutes a loss of pumping effort, so that it is reduced to the minimum required to keep the water from accumulating in the separators. The amount of valve opening is dictated by the water separation experienced in a particular installation. A valve opening equivalent to the orifice described below should be sufficient under normal conditions. Valve 76 closes to prevent draining the system when the pump 5 is stopped and also serves to hold the pressure in the system down when it might otherwise rise due to increased temperatures.

If desired, an orifice plate 52 having a fixed orifice 50 can be inserted in line 81 instead of the valve 79. The orifice size is determined by the amount of water separated in a particular installation since the conditions vary. However, for ordinary temperate climate conditions with a tight tank, an orifice of ¼ to $\tfrac{1}{16}$ inch should be sufficient for a 100-gallon a minute system.

In accordance with the initial assumption that there was no water in the tank, the stream of liquid returning to the tank would be gasoline. However, due to breathing through the vent 160 and due to seepage and drainage into the tank, water may enter the tank and, depending upon the form and cause of entrainment of the water in the gasoline, may either enter the suction pipe 17 and be discharged to the water separators 7 and returned to the bottom of the tank by way of the line 75—81 or it may collect directly at the bottom of the tank.

As the water level rises, float 103 will rise against stop 105 and will then pick up switch rod 99. When the float has risen far enough to overcome the over-center spring 115 (Figure 3), the switch lever 117 will be thrown into engagement with contact 121. This breaks the circuit through element 139 and opens switch 140 so as to deenergize the pump motor 5 and the green light 131.

At the same time however, a circuit is established from the main 123 through line 135, switch 133, line 137, switch lever 117, contact 121, line 145, control element 147, line 139, and line 136 to the main. The element 147 being thus energized closes the switch 142 which connects the scavenging pump motor 83 and the red light 129 to the main.

Thus it will be seen that no gasoline is being pumped and that water is being pumped from the bottom of the tank to waste and that this operation is indicated by the red light.

As the water level drops, the float 103 will fall with the water level until its contacts stop 107. It will then pick up the switch rod 99 and as soon as spring 115 is overcome, the switch lever 117 will be returned to engagement with contact 119, whereupon the circuit through element 147 will be broken to stop the scavenging pump and to extinguish light 129 while the circuit through element 139 will be reestablished and the motor 5 and light 131 will be reenergized. When this occurs, gasoline will again be available at the dispensing point.

The system will of course be shut down when all of the switches 133 are open.

Should the gasoline level approach the water level in the tank too closely, there is danger of water being drawn into the suction line 17. To prevent this from occurring, the float 109 is disposed in the tank at such a level that, before the gasoline approaches a dangerously low level, the level will reach the float 109 and as the level drops still further, the float and switch rod 101 will drop and switch 111 will be opened. This opens the circuit through the control element 139 and causes switch 140 to disconnect the main pump motor 5 from the main 123.

Operation can again be restored by refilling the tank 3 with gasoline through the fill pipe 100.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a liquid dispensing system the combination of a storage tank, a water separator, a first pump connected to pass liquid from the tank through the water separator to a point of discharge and a water drain connection between said separator and said tank and a second pump connected to remove water from said tank and means to control the operation of said second pump for maintaining the water in the tank below a predetermined level.

2. In a liquid dispensing system the combination of a storage tank, a water separator, a pump connected to pass liquid from the tank through the water separator to a point of discharge, a water drain connection between said separator and said tank, operative means for maintaining the water in the tank below a predetermined level, and means for stopping said pump while said level maintaining means is operative.

3. In a liquid dispensing system the combination of a storage tank, a water separator, a pump connected to pass a mixture of water and liquid to be dispensed from the tank through the water separator and to pass said liquid to a point of discharge, a water drain connection between said separator and the bottom of said tank, a second pump connected to draw water from the bottom of the tank and to discharge to waste, and float actuated control means for said pumps adapted to prevent operation of both pumps at the same time.

4. In a liquid dispensing system the combination of a storage tank, a water separator, a floating suction mechanism, a pump connected to said mechanism to pass liquid from the upper portion of the body of liquid in the tank through the water separator under pressure, to a point of discharge, a drain connection between said separator and said tank, a remote control circuit for controlling said pump, and means controlled by the water level in the storage tank for interrupting said circuit.

5. In a liquid dispensing system the combination of a storage tank, a water separator, a pump connected to pass liquid from the tank through the water separator to a point of discharge, a drain connection between said separator and said tank, a second pump connected to draw liquid from the bottom of the tank and to discharge to waste, and control means for said pumps comprising a water level responsive device in said tank and circuits controlled thereby for connecting said second pump for operation while stopping said first mentioned pump when the maximum water level in said tank is reached.

6. In a liquid dispensing system the combination of a storage tank, a water separator, a first pumping means connected to pass liquid from the tank through the water separator to a point of discharge, a water drain connection between said separator and said tank, a second pumping means connected to draw liquid from the bottom of the tank and to discharge to waste, control means for said first and second pumping means comprising a water actuated float, a switch connected for operation by said float and adapted to occupy either of two positions, a power line, and circuits controlled by said switch for disconnecting said first pumping means from and connecting said second pumping means with said power line when said float attains its uppermost position and for reversing said connections when said float reaches its lowermost position.

7. In a liquid dispensing system the combination of a storage tank, a water separator, a first pumping means connected to pass liquid from the tank through the water separator to a point of discharge, a water drain connection between said separator and said tank, a second pumping means connected to draw liquid from the bottom of the tank and to discharge to waste, control means for both said pumping means comprising a water level responsive device and circuits controlled thereby for normally connecting said first pumping means for operation and disconnecting said second pumping means and for connecting said second pumping means for operation while stopping said first mentioned pumping means when the maximum water level in said tank is reached, and a gasoline actuated float for stopping said first named pumping means when a predetermined low level of gasoline in said tank is reached.

8. In a liquid dispensing system adapted for control from a remote dispensing point, the combination of a storage tank, a water separator, a pump connected to pass liquid from the tank through the water separator to a point of discharge, a water drain connection between said separator and said tank, a second pump connected to draw liquid from the bottom of the tank and to discharge to waste, motors for said pumps, control means for said pump motors comprising a power line, a starter control element for each pump motor, a switch disposed at the dispensing point, connections between said line and said switch, a second switch constructed to occupy one or the other of two positions to connect the first switch with one or the other of said control elements, and a water level responsive float in said tank for moving said second switch from one position to the other.

9. In a liquid dispensing system the combination of a storage tank, a water separator, a pumping means connected to pass liquid from the tank through the water separator to a point of discharge, a water drain connection between said separator and said tank, a second pumping means connected to draw liquid from the bottom of the tank and to discharge to waste, control means for both said pumping means, adapted to actuate said second pumping means to maintain the water level below a predetermined maximum and means for stopping said first pumping means when the level of said dispensing liquid reaches a predetermined minimum level in said tank.

10. In a liquid dispensing system the combination of a storage tank, a floating suction connection in the tank, a water separator, a pump connected to pass liquid from the tank through said floating suction connection and through the water separator to a point of discharge, a water drain connection between said separator and said tank, a second pump connected to draw liquid from the bottom of the tank and to discharge to waste, control means for said pumps including means responsive to the level of water in said tank for actuating said second pump to maintain the water level below a predetermined maximum, and additional means responsive to the level of dispensing liquid in said tank for stopping said first pump when the level of said dispensing liquid reaches a predetermined minimum level in said tank.

CYRIL MARSH.